US012674766B2

(12) United States Patent
Rybarczyk

(10) Patent No.: US 12,674,766 B2
(45) Date of Patent: Jul. 7, 2026

(54) METHOD FOR DETECTING OPTICAL DEFECTS WITHIN WINDSHIELD

(71) Applicant: SAINT-GOBAIN GLASS FRANCE, Courbevoie (FR)

(72) Inventor: Théo Rybarczyk, Margny les Compiegne (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 280 days.

(21) Appl. No.: 18/562,456

(22) PCT Filed: May 17, 2022

(86) PCT No.: PCT/EP2022/063275
§ 371 (c)(1),
(2) Date: Nov. 20, 2023

(87) PCT Pub. No.: WO2022/243288
PCT Pub. Date: Nov. 24, 2022

(65) Prior Publication Data
US 2024/0280509 A1 Aug. 22, 2024

(30) Foreign Application Priority Data

May 20, 2021 (EP) ..................................... 21175028

(51) Int. Cl.
*G01N 21/958* (2006.01)
*G01N 21/88* (2006.01)
(Continued)

(52) U.S. Cl.
CPC ....... *G01N 21/958* (2013.01); *G01N 21/8851* (2013.01); *G06T 7/0004* (2013.01);
(Continued)

(58) Field of Classification Search
CPC . G06T 7/0004–001; G06T 2207/30108; G06T 2207/30164; G06T 7/10–136;
(Continued)

(56) References Cited

U.S. PATENT DOCUMENTS

2012/0098959 A1* 4/2012 Addington ............ G06T 7/0004
348/125

FOREIGN PATENT DOCUMENTS

EP 0 342 127 A2 11/1989
EP 0 463 940 A1 1/1992
(Continued)

OTHER PUBLICATIONS

Dixon, Michael, et al. "Measuring optical distortion in aircraft transparencies: a fully automated system for quantitative evaluation." Machine Vision and Applications 22.5 (2011): 791-804. (Year: 2011).*
(Continued)

*Primary Examiner* — Geoffrey E Summers
(74) *Attorney, Agent, or Firm* — CUSHMAN PARTNERS, LLC

(57) ABSTRACT

A method for detecting optical defects within a windshield. The method takes, as input, a digital image map of the intensity of optical power of a windshield, and provides, as output, a digital image map of optical defects. The method includes (a) an image processing of the digital image map of optical powers for detecting and delimiting regions that differs in intensity of optical power; (b) computing, for each detected regions, a representative geometric distance and a representative value of the optical power; (c) computing an image map of the detected regions for which the product between the representative geometric distance and the representative value of the optical power is equal or superior to $2.9 \cdot 10^{-4}$.

16 Claims, 2 Drawing Sheets

(51) Int. Cl.
    *G06T 7/00*       (2017.01)
    *G06T 7/12*       (2017.01)

(52) U.S. Cl.
    CPC ........ *G06T 7/12* (2017.01); *G01N 2021/8864*
        (2013.01); *G01N 2021/8887* (2013.01); *G01N*
                    *2021/9586* (2013.01)

(58) Field of Classification Search
    CPC ....... G06T 7/181; G06T 7/187; G01N 21/958;
               G01N 2021/9586; G01N 2021/8864;
                    G01N 21/8851; G01N 21/8887
    See application file for complete search history.

(56)                References Cited

FOREIGN PATENT DOCUMENTS

| EP | 0 685 733 A1 | 12/1995 |
|----|--------------|---------|
| EP | 1 061 357 A2 | 12/2000 |
| EP | 3 012 619 A1 | 4/2016 |
| EP | 3 756 114 A1 | 12/2020 |
| GB | 2 152 210 A | 7/1985 |
| WO | WO 98/17993 A2 | 4/1998 |
| WO | WO 2009/042903 A1 | 4/2009 |
| WO | WO 2017/008159 A1 | 1/2017 |
| WO | WO 2019/162233 A1 | 8/2019 |

OTHER PUBLICATIONS

International Search Report as issued in International Patent Application No. PCT/EP2022/063275, dated Sep. 9, 2022.

\* cited by examiner

1000 ～

METHOD FOR DETECTING OPTICAL DEFECTS WITHIN WINDSHIELD

CROSS-REFERENCE TO RELATED APPLICATIONS

This application is the U.S. National Stage of PCT/EP2022/063275, filed May 17, 2022, which in turn claims priority to European patent application number 21175028.6 filed May 20, 2021. The content of these applications are incorporated herein by reference in their entireties.

TECHNICAL FIELD

The present invention pertains to computer implemented methods for detecting optical defects within windshields.

TECHNICAL BACKGROUND

Windshields are well-known in the transport industry, e.g. automotive, rail transport and aeronautics. They are usually made of two bended sheets of glass that are laminated with a polymer interlayer.

A windshield is a glazing through which a driver views what is ahead, e.g. roads, rails, landscapes, . . . . Therefore, for security reasons, the distortion of objects as seen through a windshield should be as low as possible, at least it should not confuse the driver. In this context, the optical quality of windshields has to fulfil certain requirements which are detailed in section 9.2 of Annex 3 of the Regulation No 43 of the Economic Commission for Europe of the United Nations (UN/ECE).

Several methods and instruments are described in the art, that may be intended to measure the optical distortion of windshields in the framework of the Regulation No 43.

EP 0 463 940 A1 describes a process for measuring the optical quality of a windshield based on shadow illumination.

WO 9817993 A2, GB 2 152 210 A and EP 1 061 357 A2 describe method to measure optical distortions of windshield through image analysis of transmitted or reflected patterns.

WO 2017/008159 A1 describes a method to detect optical defects in windshields through analysis of composite images of chromatic aberrations.

SUMMARY OF THE INVENTION

Technical Problem

As efficient as they may be, methods described in the art may fail to detect some optical defects which may however be detected by human eyes. Since human vision is generally more flexible than most of the inspection systems which implements said methods, optical defects, which may be only visible on the driver and/or passenger side of the windshield, sometimes at a specific angle or different angles, may be completely overlooked by inspection systems on manufacturing line. A direct and negative con-sequence is that a windshield, which was initially considered as fulfilling the technical specifications, may be rejected by customers afterwards. Complaints and production losses may occur.

Moreover, it has been found that some of these over-looked or undetected optical defects may have not the same features or signature, so that inspection systems may behave differently from one to another regarding their detection. With some specific setups, certain inspection systems may be able to detect them while others may fail. Thus, finding out a setup and/or a criterion to make inspection systems detect them regardless the features of the inspection systems is challenging. Furthermore, even if such setup or criterion may be found, this still requires to remain compatible with the whole configuration of a manufacturing line.

Therefore, there is a need for a novel, easy-to-implement method for detecting those specific optical defects which may be undetected by current inspection systems but may remain visible to a human driver.

Solution to the Technical Problem

In a first aspect of the invention, there is provided a computer implemented method for detecting optical defects within windshields as described in claim 1, dependant claims being advantageous embodiments.

In a second aspect of the invention, there is provided a data processing system, a computer program and a computer-readable medium to implement the method.

In a third aspect of the invention, there is provided a process for detecting optical defects within windshields as described in claim 10, independent claims being advantageous embodiment.

Both method and process may be used in a manufacturing process of windshields.

Advantages of the Invention

A first outstanding benefit of the invention is that it allows to detect optical defects in windshields that may remain undetected by most common inspection systems but may still be seen by human eyes, e.g. eyes of a driver.

A second advantage is that the invention is relatively easy to implement in existing manufacturing processes so that it requires few, if any, adaptation. More precisely, the computer implemented invention and the process according to the invention may benefit from the facilities for acquiring digital image maps of optical power that are already available in manufacturing lines and/or control quality processes.

A third advantage is that the invention indirectly provides insights on the relative size with which an optical defect may appear to a driver when looking at distant object through a windshield. It then allows to assess whether an optical defect may impinge the case of viewing.

DETAILED DESCRIPTION OF EMBODIMENTS

Figure 1:
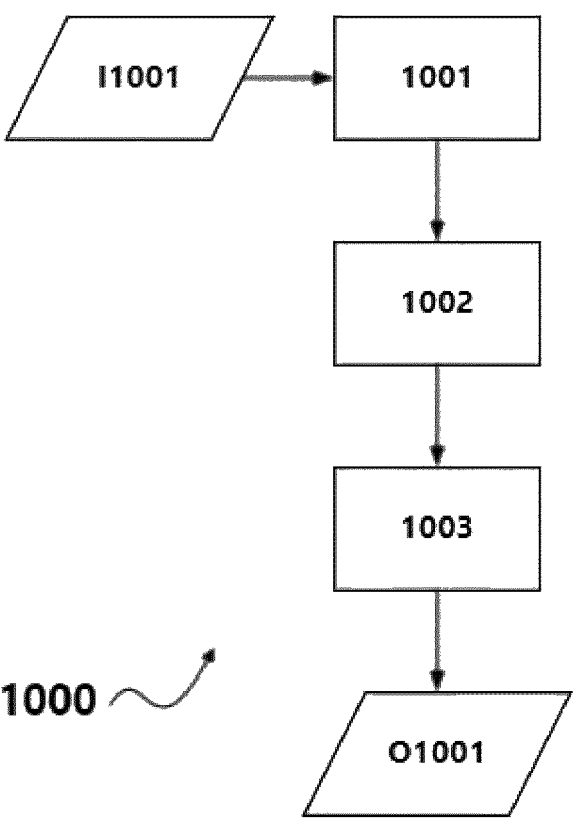
FIG. 1 is a data flow diagram of a computer implemented method for detecting optical defects to an embodiment of the first aspect of the invention

With reference to [FIG. 1], in an embodiment of the first aspect of the invention, there is provided a computer implement method 1000 for detecting optical defects within a windshield, wherein said method takes, as input I1001, a digital image map of intensity of optical power of a windshield, and provides, as output O3001, a digital image map of optical defects, wherein said method 1000 comprises the following steps:

(a) image processing 1001 of said digital image map of optical powers for detecting and delimiting regions that differs in intensity of optical power;

(b) computing 1002, for each detected regions, a representative geometric dimension and a representative value of the optical power;

(c) computing 1003 an image map of the detected regions for which the product between the representative geometric distance and the representative value of the optical power is equal or superior to $2.9 \cdot 10^{-4}$.

Figure 2:
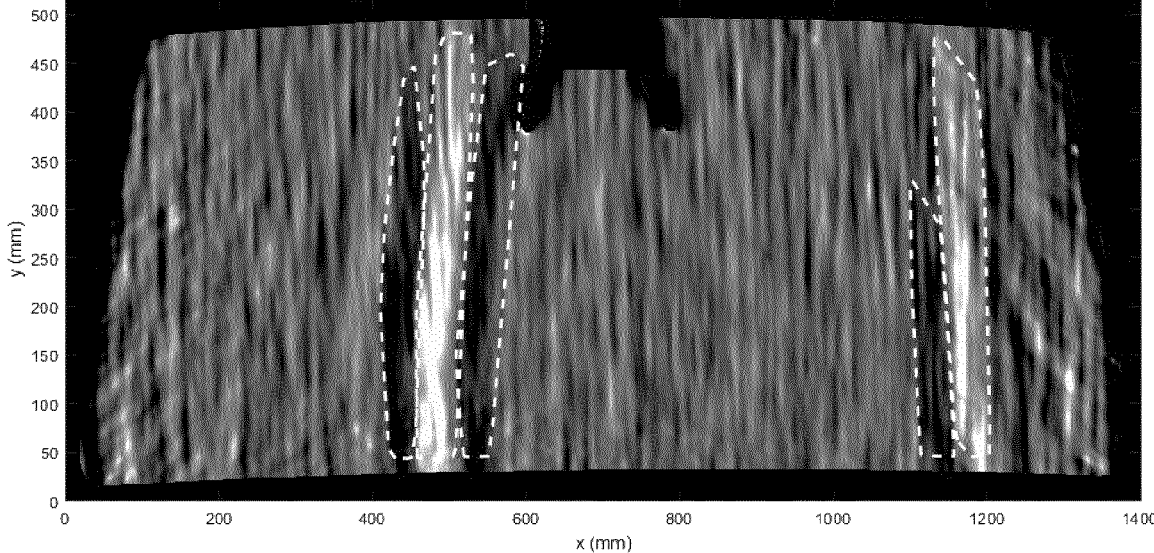
FIG. 2 is an example of a digital image map, in greyscale, of the intensity of optical power of a windshield.

The method 1000 takes, as input I1001, a digital image map of intensity of optical power of a windshield, an example of which is provided on [FIG. 2]. Optical power refers to the ability of a lens to focus light. Depending on how the lens refracts light, the light may diverge or converge. The SI unit for optical power is the inverse meter ($m^{-1}$), also called dioptre (dpt).

On [FIG. 2], the intensity of optical power is represented by the greyscale pattern over the whole windshield, the white boxed regions are discussed later on.

Measurement of optical power in windshield is well described in the art, e.g. EP 3012619 A1, EP 0 463 940 A1, EP 0 342 127 A1, EP 0 685 733 A1. Alternatively, or as complement to measurements, optical power may also be simulated, e.g. EP 3 756 114 A1. All these methods may provide directly or may be adapted to acquire a digital image map of optical power of a windshield.

In some embodiments, the digital image maps may be acquired at a specific angle or for a range of given angles in respect to normal of the windshield. In preferred embodiments, the digital image maps may be acquired at an angle or in a range of angles corresponding or being representative of the angles at which a driver may view objects through the windshields when in used. Indeed, as the inclination angle of a windshield in respect to the framework of a vehicle usually vary from a vehicle to another, the viewing angle of the driver, and then the probability of an optical defect to be viewed, may also vary depending on this inclination angle. Therefore, it may be advantageous to take this effect into account when acquiring the digital maps of the optical power. The precision and the reliability of the method may be improved.

The image processing 1001 of step (a) to detect and delimit regions of the digital image map that differs in intensity of optical power may any adapted image processing method for object detection. The image processing method may be neural network or non-neural network methods.

In preferred embodiments, the image processing 1001 may be a blob detection, in particular a blob detection through the computing of the Laplacian of the Gaussian of the digital image map of optical powers, of the difference of the Gaussian of the digital image map of optical powers or of the determinant of the Hessian of the digital image map of optical powers. Blob detection may be simpler to implement than neural network method while still providing valuable results for most kinds of windshield and applications.

In step (b), the representative geometric dimension of detected regions may depend on the shape chosen to represent their boundaries at step (a). However, as a general rule of thumb, to be representative, the computed value for geometric dimension should advantageously show little variations whatever the chosen shape providing that the shape is relevant to delimit the detected regions.

Many shapes may suit and may be more or less complex depending on the image processing method used for detecting and delimiting the regions and the degree of closeness and preciseness which may be looked for to the boundaries of the regions. For example, they may be convex shapes such as convex polygons, e.g., squares or rectangles, or curved figures, e.g., circles or ellipses, or concave shapes such as concave polygons or concave curved figures.

Since the optical defects under the scope of the invention may often have regular, relatively rounded or elongated convex shape, in certain advantageous embodiments, the detected regions at step (a) may be delimited with ellipses and wherein the representative geometric distances of the detected regions computed at step (b) are the minor axis of said ellipses.

A step (b), the computed representative geometric dimension of each detected regions has the unit of length, e.g. meter in SI unit, and the computed representative value of optical power has the unit of reciprocal length, e.g. $m^{-1}$ or dpt in SI unit.

The representative value of the optical power of each detected region may be computed through different methods. In some embodiments, the representative value of the optical power of each detected regions is the average optical power, the median optical power, the maximum optical power or the maximum/minimum optical power difference in said detected region.

The value of the product computed at step (c) is a dimensionless number. In certain embodiments, this number may be considered as representative of an angle which may be expressed in radians (rad). In this respect, the minimum value of $2.9 \cdot 10^{-4}$ provided at step (c) may then be considered as representative of a minimal distortion factor at which an optical defect may appear to human eyes, i.e. driver, when looking through a windshield at an object located at given distance, D, from that windshield. The product of this minimum value of $2.9 \cdot 10^{-4}$, expressed in radians, with the distance D may provide the apparent size of an optical defect with the regard to the distance, D, of the object at which a driver may look at.

At step (c), an image map of the detected regions is computed for detected regions for which the product between the representative geometric distance and the representative value of the optical power is equal or superior to $2.9 \cdot 10^{-4}$. The minimal value of $2.9 \cdot 10^{-4}$ may then be considered as the low boundary value of a semi-infinite interval. Because any optical defects may be virtually of any larger size than what human eyes may perceive, any attempt to define a high boundary value may be considered as purely artificial and arbitrary. In practice, a high boundary value may be defined depending on the desired requirements for larger optical distortions.

In some embodiments, the value of the product computed at step (c) may be comprised between $5 \cdot 10^{-4}$ and $2 \cdot 10^{-3}$, preferably between $7 \cdot 10^{-4}$ and $1.5 \cdot 10^{-3}$; more preferably, may be $1 \cdot 10^{-3}$. These intervals of values are greater than the minimal value of $2.9 \cdot 10^{-4}$. Thus, they may seem to be less stringent than minimal value of $2.9 \cdot 10^{-4}$. However, they may be adapted to the most common configuration of windshields, in particular in respect to the framework of most common vehicles.

The method provides, as output O1001, an image map of the detected regions for which the product between the representative geometric distance and the representative value of the optical power is equal or superior to $2.9 \cdot 10^{-4}$. An example of such image map is provided on [FIG. 2] on which the white boxed regions represent the detected regions and are superimposed to the digital image map of optical power.

In certain embodiments, the detected regions at step (b) may further be such that their apparent size in the scale of visual decimal acuity is between 0.5 and 3; preferably between 0.67 and 1.25, more preferably is 1. The visual acuity, in the scope of human vision, is well known in the art and fully described in the EN ISO 8596:2018 standard. A criterion on the apparent size may be an advantageous complement in some applications, i.e. aeronautics, motorsports, premium vehicles, in which a high degree of optical quality is requested. Such criterion may ensure that the optical defects to which human eyes may be sensitive may be detected with a high degree of reliability.

The method 1000 according to the first aspect of the invention may be advantageously used in a manufacturing process of windshields. As manufacturing processes may already comprise instruments for acquiring digital maps of optical power, few, if any, adaptation of said process may be required to implement the method.

Figure 3:
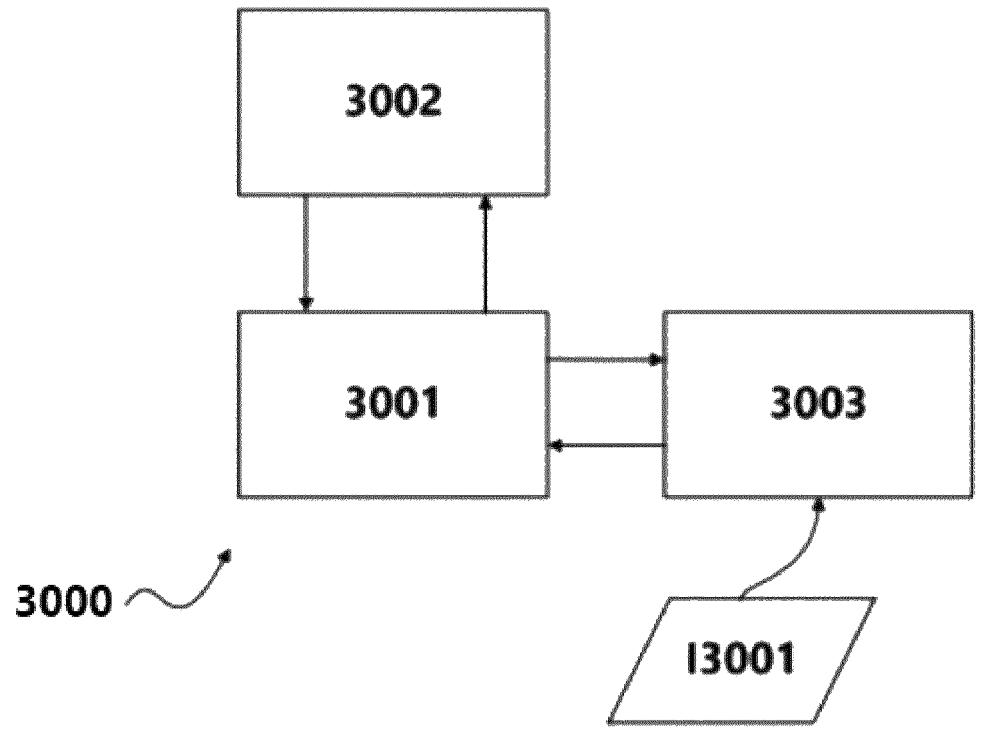
FIG. 3 is a data processing system according to the second aspect of the invention.

In a second aspect of the invention, with reference to [FIG. 3], there is provided a data processing system 3000 comprising means for carrying out a method 1000 according to any one of the embodiments of the first aspect of the invention, and a computer program 13001 comprising instructions which, when executed by a computer, cause the computer to carry out a method according to any one of embodiments of the first aspect of the invention.

The data processing system 3000 comprises means 3001 for carrying out a method according to any of the embodiments of the first and second aspect of the invention. Example of means 3001 for carrying out the method may be a device which can be instructed to carry out sequences of arithmetic or logical operations automatically to perform tasks or actions. Such device, also called computer, can comprise one or more Central Processing Unit (CPU) and at least a controller device that are adapted to perform those operations. It can further comprise other electronic components like input/output interfaces 3002, non-volatile or volatile storage devices 3003, and buses that are communication systems for the data transfer between components inside a computer, or between computers. One of the input/output devices can be user interface for human-machine interaction, for example graphical user interface to display human understandable information.

As calculation may require a lot of computational power to process substantial amounts of data, the data processing system may advantageously comprise one or more Graphical Processing Units (GPU) whose parallel structure makes them more efficient than CPU, in particular for image processing in ray tracing.

Regarding the computer program 13001, any kind of programming language, either compiled or interpreted, may be used to implement the steps of the method of the invention. The computer program 13001 may be part of a software solution, i.e., part of a collection of executable instructions, code, scripts, or the like and/or databases.

In certain embodiments, there is also provided a computer-readable storage or medium 3003 comprising instructions which, when executed by a computer, cause the computer to carry out the method according to any of the embodiments of the first aspect of the invention.

The computer-readable storage 3003 may be preferably a non-volatile storage or memory, for example hard disk drive or solid-state drive. The computer-readable storage may be removable storage media or a non-removable storage media as part of a computer.

Alternatively, the computer-readable storage may be a volatile memory inside a removable media.

The computer-readable storage 3003 may be part of a computer used as a server from which executable instructions can be downloaded and, when they are executed by a computer, cause the computer to carry out a method according to any of the embodiments described herein.

Alternatively, the program 13001 may be implemented in a distributed computing environment, e.g., cloud computing. The instructions can be executed on the server to which client computers can connect and provide encoded data as inputs to the method. Once data are processed, the output can be downloaded and decoded onto the client computer or directly send, for example, as instructions. This kind of implementation can be advantageous as it can be realised in a distributed computing environment such as a cloud computing solution.

In an embodiment of the third aspect of the invention, there is provided a process for detecting optical defects within a windshield, wherein said method comprises the following steps:

(a) acquiring a digital image map of the intensity of optical power of a windshield;

(b) processing, with a computing system, said digital image map for detecting and delimiting regions that differs in intensity of optical power;

(c) computing, with a computing, system, an image map of the detected regions for which the product between the representative geometric distance and the representative value of the optical power is equal or superior to $2.9 \cdot 10^{-4}$.

Technical aspects and features of the different embodiments detailed in the context of the first and second aspects of the invention may also apply to the third aspect of the invention. It is in the reach of a person skilled in the art to change, transform or adapt them in a process according to the third aspect of the invention.

The invention claimed is:

1. A computer implemented method for detecting optical defects within a windshield, wherein said method takes, as input, a digital image map of an intensity of optical power of a windshield, and provides, as output, a digital image map of optical defects, wherein said method comprises the following steps:

(a) performing an image processing of said digital image map of optical powers for detecting and delimiting regions that differ in intensity of optical power;

(b) computing, for each of the detected regions, a representative geometric dimension and a representative value of the optical power;

(c) computing a digital image map of the detected regions for which the product between the representative geometric dimension and the representative value of the optical power falls within a range, the range including values equal or superior to $2.9 \cdot 10^{-4}$, and (d) based on the digital image map of detected regions from step (c), automatically identifying the windshield as defective.

2. The computer implemented method according to claim 1, wherein the range in step (c) is between $5 \cdot 10^{-4}$ and $2 \cdot 10^{-3}$.

3. The computer implemented method according to claim 2, wherein the range in step (c) is between $7 \cdot 10^{-4}$ and $1.5 \cdot 10^{-3}$.

4. The computer implemented method according to claim 1, wherein the image processing of step (a) is a blob detection through the computing of the Laplacian of the Gaussian of the digital image map of optical powers, of the difference of the Gaussian of the digital image map of optical powers or of the determinant of the Hessian of the digital image map of optical powers.

5. The computer implemented method according to claim 1, wherein the detected regions at step (a) are delimited with ellipses and wherein the representative geometric dimensions of the detected regions computed at step (b) are the minor axis of said ellipses.

6. The computer implemented method according to claim 1, wherein the representative value of the optical power of each detected regions is the average optical power, the median optical power, the maximum optical power or a difference between the maximum optical power and a minimum optical power in said detected region.

7. A data processing system comprising means for carrying out the method according to claim 1.

8. A non-transitory computer-readable medium comprising instructions which, when executed by a computer, cause the computer to carry out the method according to claim 1.

9. A process comprising performing a method according to claim 1 in a manufacturing process of a windshield.

10. A computer implemented method for detecting optical defects within a windshield, wherein said method takes, as input, a digital image map of an intensity of optical power of a windshield, and provides, as output, a digital image map of optical defects, wherein said method comprises the following steps:

(a) performing an image processing of said digital image map of optical powers for detecting and delimiting regions that differ in intensity of optical power;

(b) computing, for each detected regions which are such that their apparent size in the scale of visual decimal acuity falls within a first range between 0.5 and 3, a representative geometric dimension and a representative value of the optical power;

(c) computing a digital image map of the detected regions for which the product between the representative geometric dimension and the representative value of the optical power falls within a second range, the second range including values equal or superior to $2.9 \cdot 10^{-4}$, and (d) based on the digital image map of detected regions from step (c), automatically identifying the windshield as defective.

11. The computer implemented method according to claim 10, wherein the first range of the apparent size in the scale of visual decimal acuity is between 0.67 and 1.25.

12. The computer implemented method according to claim 10, wherein the second range in step (c) is between $5 \cdot 10^{-4}$ and $2 \cdot 10^{-3}$.

13. The computer implemented method according to claim 12, wherein the second range in step (c) is between $7 \cdot 10^{-4}$ and $1.5 \cdot 10^{-3}$.

14. A process for detecting optical defects within a windshield, the process comprising:

(a) acquiring a digital image map of an intensity of optical power of a windshield;

(b) processing, with a computing system, said digital image map for detecting and delimiting regions that differ in intensity of optical power;

(c) computing, with the computing system, a digital image map of the detected regions for which the product between a representative geometric dimension and a representative value of the optical power falls within a range, the range including values equal or superior to $2.9 \cdot 10^{-4}$, and (d) based on the digital image map of detected regions from step (c), automatically identifying the windshield as defective.

15. The process according to claim 14, wherein the range in step (c) is between $5 \cdot 10^{-4}$ and $2 \cdot 10^{-3}$.

16. The process according to claim 15, wherein the range in step (c) is between $7 \cdot 10^{-4}$ and $1.5 \cdot 10^{-3}$.

\* \* \* \* \*